United States Patent [19]

Schumacher

[11] Patent Number: 5,086,540
[45] Date of Patent: Feb. 11, 1992

[54] SUPPORT MECHANISM FOR ROOM DIVIDERS

[75] Inventor: Markus Schumacher, Hamburg, Fed. Rep. of Germany

[73] Assignee: Messerschmitt-Boelkow-Blohm GmbH, Munich, Fed. Rep. of Germany

[21] Appl. No.: 547,977

[22] Filed: Jul. 2, 1990

[30] Foreign Application Priority Data

Jul. 10, 1989 [DE] Fed. Rep. of Germany ....... 3922580

[51] Int. Cl.⁵ .................... A47H 1/00; A47H 15/00
[52] U.S. Cl. .................. 16/87.4 R; 16/95 D; 160/201; 211/105.6; 211/123; 211/162; 211/195; 248/264
[58] Field of Search .......... 16/87 R, 87.2, 87.4 R, 16/87.4 W, 92, 95 R, 94 D, 95 D; 211/105.1, 123, 105.2, 105.3, 105.4, 105.5, 105.6, 113, 118, 162, 189, 195; 292/166, DIG. 37; 248/214, 251, 261, 264, 343, 354.5

[56] References Cited

U.S. PATENT DOCUMENTS

| 959,081 | 5/1910 | Simmons | 292/166 |
|---|---|---|---|
| 1,190,453 | 7/1916 | Pease | 211/123 |
| 2,322,040 | 6/1943 | Maruri | 292/166 |
| 2,523,857 | 9/1950 | Baumgardt | 211/123 |
| 2,542,964 | 2/1951 | Koett et al. | 211/123 |
| 2,617,571 | 11/1952 | Hart | 211/123 |
| 2,698,094 | 12/1954 | Simpson | 248/264 |
| 3,892,378 | 7/1975 | Lane | 248/354.5 |
| 4,599,763 | 7/1986 | Toder | 16/95 D |
| 4,744,471 | 5/1988 | Leister | 211/7 |

Primary Examiner—Lowell A. Larson
Assistant Examiner—Thomas C. Schoeffler
Attorney, Agent, or Firm—W. G. Fasse

[57] ABSTRACT

A support mechanism for room dividers is constructed to support room divider curtain rods, for example, to divide an aircraft cabin into several cabin sections. For this purpose a carrier crossbeam is formed of two beam elements hinged to each other in scissors fashion so that the beam elements can buckle downwardly when an interlocking device is released through an operating handle. The end of each beam element is formed as a wall engaging member, such as a T-shaped mounting foot. Each beam element has an extension, whereby a hinge plate is connected between the beam element and its extension. The operating handle which operates the interlocking device is arranged at the end of the extension. At least one locking device and operating handle units, preferably two such units, are used.

18 Claims, 2 Drawing Sheets

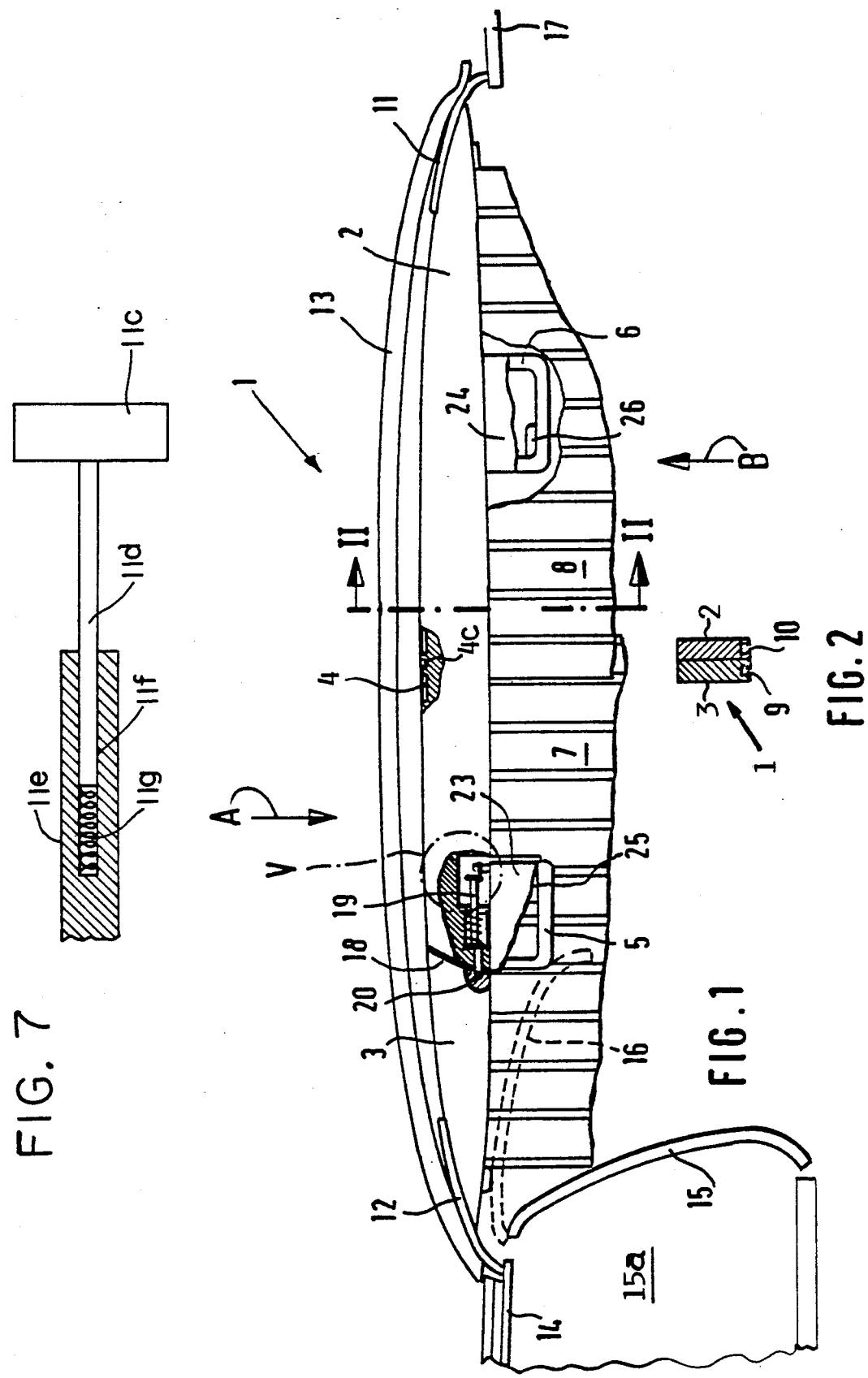

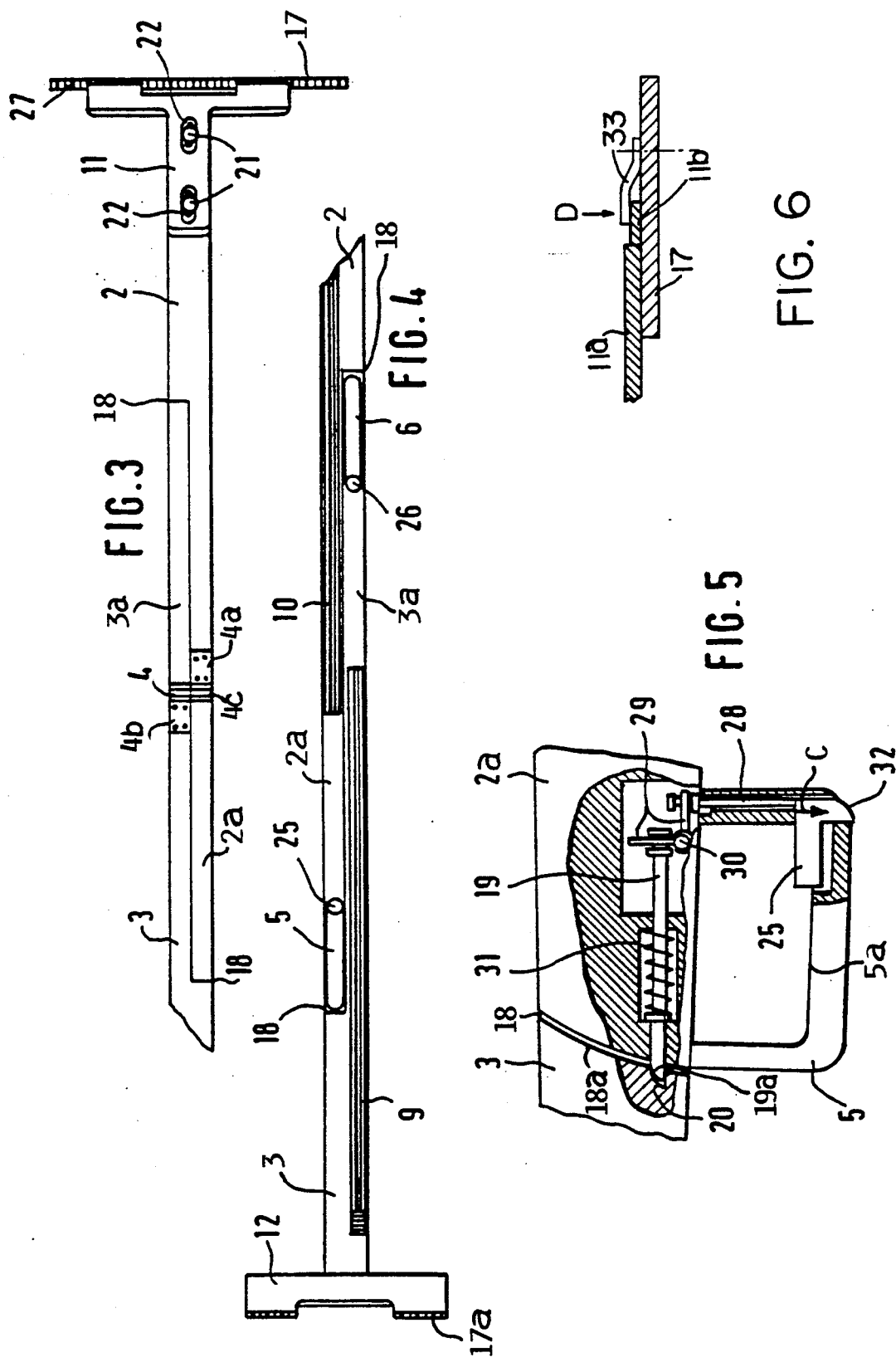

SUPPORT MECHANISM FOR ROOM DIVIDERS

FIELD OF THE INVENTION

The invention relates to a support mechanism for room dividers. More specifically, the present room divider is particularly suitable for dividing an aircraft cabin of passenger aircraft into different cabin sections by a curtain or curtain sections.

BACKGROUND INFORMATION

It is known to use such mechanisms for supporting room divider curtain rods in passenger aircraft to divide the cabin, for example, into different class sections. The mechanisms are secured to the cabin structure close to the cabin ceiling. In other words, the support structure can be placed substantially at any location along the longitudinal axis of the aircraft cabin. The placement or mounting of the support mechanism does not require any tools. The variability in the mounting location along the aircraft cabin length is achieved in that substantially two beam elements forming a carrier crossbeam are pivoted to each other for a toggle action during installation and removal and for an interlocking of the two beam elements in their installed state.

The cabin side walls are equipped with longitudinal grooves for accepting the mounting feet of the beam elements. For securing the mechanism, the two beam elements are slightly buckled relative to each other in scissors fashion and the mounting feet are inserted into the longitudinal cabin wall grooves. Thereafter, the two beam elements are pushed into their stretched out state and interlocked by a toggle action. Pushing the two beam elements pivoted to each other into the stretched out state provides a toggle lever action which in combination with the spring biasing of the mounting feet results in a force-locking, force-transmitting connection between the support mechanism and the cabin walls.

It is necessary that such a support mechanism does not interfere with a person who is taller than average when such a person wants to walk along the cabin isle. Accordingly, the mechanism is positioned relatively high next to the ceiling. As a result, a person who is of less than average height has trouble installing or removing the support mechanism. In that case, the person of less than average height must use a stepladder or the like to do the job.

OBJECTS OF THE INVENTION

In view of the foregoing, it is the aim of the invention to achieve the following objects singly or in combination:

to construct a support mechanism of the type described above in such a way that it can be installed and removed with ease by a person of less than average height without any tools and without any stepladders or the like;

to make sure that persons taller than average can pass under the support mechanism without hindrance;

to make sure that an unintended or unauthorized removal of the support mechanism is substantially prevented or at least avoidable; and to construct the support mechanism in such a manner that economical manufacturing and installation tolerances are permissible for the support mechanism as well as for the cabin walls without requiring any adjustment work.

SUMMARY OF THE INVENTION

According to the invention there is provided a support mechanism for room dividers, especially for dividing an aircraft cabin into different cabin sections. Such a divider comprises a carrier crossbeam having two beam elements hinged to each other in a scissors fashion. The two beam elements are locked to each other when they are in their extended state substantially in parallel to each other. Each beam element has a mounting foot for engagement with a supporting wall structure and opposite the mounting foot a beam element extension, whereby a hinge or pivot is located between the extension and the mounting foot. An operating handle cooperates with a locking device, whereby the support mechanism can easily be pushed into a mounted position, or pulled out of such a position. Preferably, two locks and two handles are provided, one for each beam element.

It is a special advantage of the invention that the beam can be mounted and removed by persons of all sizes and that these operations can be performed simply and with ease without any tools or step ladders.

Another advantage is seen in that an unintended or unauthorized removal of the support mechanism is substantially avoided. The inviting feature of a handle to be used, even by unauthorized persons, is avoided by covering the handles with information bearing labels. Another advantage is seen in that the manufacturing tolerances for the support mechanism itself, and also for the supporting wall structure do not have to meet stringent requirements so that installation can be accomplished even without any adjustment work.

BRIEF DESCRIPTION OF THE DRAWINGS

In order that the invention may be clearly understood, it will now be described, by way of example, with reference to the accompanying drawings, wherein:

FIG. 1 is a side view of the present support mechanism for room dividers shown installed in an aircraft cabin, whereby the view direction is in the longitudinal cabin axis;

FIG. 2 is a sectional view along section line II—II in FIG. 1;

FIG. 3 is a view in the direction of the arrow A in FIG. 1, whereby a portion of the support mechanism has been broken off to simplify the illustration;

FIG. 4 is a view in the direction of the arrow B in FIG. 1, whereby again a portion of the mechanism has been broken away;

FIG. 5 is an enlarged view, partially in section, of a portion approximately indicated by a dashdotted circle V in FIG. 1;

FIG. 6 is a side view, partially in section, of a spring arrangement for holding a mounting foot of the present mechanism in place; and FIG. 7 is a view in a direction similar to direction A in FIG. 1, showing a spring biased, telescoping mounting foot for the present mechanism.

DETAILED DESCRIPTION OF PREFERRED EXAMPLE EMBODIMENTS AND OF THE BEST MODE OF THE INVENTION

FIGS. 1 and 2 show a support mechanism for room dividers, including a carrier crossbeam 1 for supporting curtain sections 7 and 8 on respective curtain rods 9 and 10, preferably forming an integral part of the crossbeam 1 as shown in FIG. 2. The carrier crossbeam 1 comprises two beam elements 2 and 3 pivoted or journalled to each other by a hinge 4 which is preferably a double hinge having two hinge plates 4a and 4b interconnected by a hinge pin 4c best seen in FIG. 3. The double hinge 4 functions so that for storage purposes a scissors type folding of the two beam elements 2 and 3 through 180° is possible. For this purpose the hinge pin 4c extends perpendicularly to a vertical plane defined by the two beam elements 2 and 3. The hinge pin 4c also extends horizontally when the crossbeam 1 is installed in a working position. Each beam element 2, 3 is equipped at its end with a mounting foot 11 or 12 respectively. The mounting foot is inserted in or supported on by a wall structure element 14, 17 as shown in FIG. 1. These wall structure elements 14, 17 are part of the cabin wall which is not shown. The left-hand foot 12 rests on a wall element 14 which is part of a luggage compartment 15a closed by a lid 15, the open position of which is shown at 16 by dashed lines. The right-hand foot 11 in FIG. 1 rests on a wall element 17 also forming part of the cabin wall.

Each beam element 2, 3 comprises a beam extension 2a or 3a as best seen in FIG. 3. The beam extensions 2a, 3a extend away from the respective hinge plate 4a, 4b, opposite the respective foot 11, 12. Preferably, each extension 2a, 3a is equipped with a locking mechanism including a locking pin 19 and an operating device for the locking mechanism, including a handle 5, 6. These operating handles 5, 6 are preferably secured to the downwardly facing surface of the respective beam element extension 2a, 3a, as shown in FIG. 4.

The above mentioned curtain sections 7 and 8 are conventionally secured to the curtain rods 9 and 10 secured to the beam elements as shown in FIG. 2, wherein the thickness of the individual beam elements 2, 3 is apparent.

Referring to FIG. 5, each handle 5, 6 cooperates with its locking device preferably installed in the free end of the extension 2a, 3a respectively. However, only the locking device and operating handle 5 are shown because the same arrangement is present at the free end of the extension 3a, merely in mirror-symmetrical fashion. The locking device includes a locking pin 19 biased by a spring 31 into the locked position shown in FIG. 5. In this position the tip of the locking pin 19 engages a bore 20 in the beam element 3. The tip of the locking pin 19 has a slanted surface 19a so that it may automatically snap into the bore 20 without being able to automatically snap out again because the spring 31 keeps the locking pin tip engaged in the bore 20 in the locked position shown in FIG. 5. In its locked position the two beam elements 2 and 3 form a stiff carrier crossbeam which bridges the distance between the wall support elements 14 and 17. The operating handles 5 and 6 are preferably covered with information bearing labels 23, 24 so that normally the handles are not recognizable so as to guard against unauthorized use of these handles. When the carrier crossbeam is to be mounted or set in its operating position, the labels 23, 24 are merely flipped upwardly so as to make the handles accessible.

FIGS. 3 and 4 illustrate the T-configuration of the mounting feet 11 and 12. Mounting foot 11 is, for example, connected to its beam element 2 by two screws 21 each passing through an elongated hole 22, thereby making it possible to adapt the present carrier beam to different cabin widths within limits determined by the length of the holes 22. The mounting foot 12 is rigidly secured to its beam element 3. The feet 11, 12 may be equipped with a toothed rack type edge 17a engaging a respective toothed rack groove 27 in the wall structures 14 and 17 to avoid axial shift.

In order to mount the carrier beam 1, the two handles 5 and 6 are gripped and the two beam elements 2 and 3 are slightly tilted about the hinging axis of the hinge 4. The edges 17a automatically engage the respective grooves 27 as the handles 5, 6 are pushed upwardly after the proper seating of the edges 17a in the grooves 27 has been inspected. As the handles 5, 6 are pushed upwardly, the slanted tip 19a of the locking pin 19 moves, against the force of the compression spring 31, into the gap 18 between the curved free end of the beam extension 2a and the curved surface 18a of the beam element 3. When the end position is reached, the tip 19a engages the bore 20. The curvature provided by the end surface 18a and the respective end surface of the beam extension 2a makes sure that the two beam elements are limited in their pivoting to a 180° movement. The gap 18 in FIG. 5 is shown somewhat exaggerated, since in the end position the curved surface 18a will engage the end surface. Once the pin 19 is engaged in the bore 20, a force-transmitting interlocking is accomplished, providing a rigid carrier beam 1 for the attachment of the curtain sections 7, 8. When the mounting feet 11, 12 are properly seated in the respective grooves, the rigidity of the beam is enhanced by a toggle lever action which in turn is supported by the force of the spring 31 shown in FIG. 5. In order to release the carrier beam 1 it is necessary that both operating handles, including their operating elements 25, 26 are activated simultaneously. This requirement provides a safety feature against an undesired removal of the carrier beam 1.

As mentioned above, FIG. 5 illustrates the handle 5 and the locking pin 19 in the locked condition. In this condition the slanted tip 19a of the locking pin 19 engages a bore 20 in the beam element 3. The slanted tip 19a enables the pin 19 to automatically engage the bore 20 when the beam element extension 2a turns clockwise into the locking position until the gap 18 is closed by the contact of the free curved end of the extension 2a with the curved surface 18a of the element 3. Each handle 5, 6 is equipped with an operating element 25, 26 which in turn is connected through a pull rod 28 to a crank type lever 29 pivotable about an axle 30. One arm of the crank type lever 29 engages the upper end of the pull rod 28. The other arm of the crank type lever 29 engages the right-hand end of the locking pin 19. Thus, when the operating element 29 is pushed down in the direction of the arrow C, the crank type lever 29 turns clockwise, thereby pulling the tip 19a of the pin 19 out of the bore 20. The operating element 26 in the handle 6 functions accordingly. When the locking device is properly locked as shown in FIG. 5, the operating element 25 is located somewhat above the surface 5a of the handle 5, thereby signifying the properly locked condition. On the other hand, when proper locking did not take place, the element 25 with its downwardly facing end 32 will project out of the outer contour of the handle 5, thereby signifying that the locking did not take place properly. The downwardly facing end 32 may be painted with a bright color, thereby enhancing its visibility when it projects out of the handle 5.

FIG. 6 shows a modification in which a mounting foot 11a has a flange 11b that is pressed down by a spring 33 exerting a pressure as indicated by the arrow D on the mounting flange 11b of the mounting foot 11a.

The flange surface contacting the spring 33 may be somewhat slanted to facilitate pushing the flange 11b under the spring 33.

FIG. 7 shows a mounting foot 11c forming, with a shank 11d a T-configuration. The shank 11d is guided for telescoping in a guide bore 11f of a beam element 11e, preferably against the force of a compression spring 11g which will tend to keep the beam in a stretched out state in which the two beam elements extend in parallel to each other.

Although the invention has been described with reference to specific example embodiments, it will be appreciated that it is intended to cover all modifications and equivalents within the scope of the appended claims.

What I claim is:

1. A support mechanism for dividing an aircraft cabin into different sections by a curtain (7, 8), comprising a carrier crossbeam including two beam elements, hinge means of interconnecting said beam elements with each other to permit a vertical scissors motion of said two beam elements relative to each other, means for locking said beam elements against journalling movements when said beam elements extend substantially in parallel to each other in an installed state, each beam element having a mounting foot for engagement with a supporting wall structure of said aircraft cabin, each beam element further having an extension opposite said mounting foot, said hinge means being arranged between said extension and said mounting foot, operating means operatively arranged for cooperation with said locking means for unlocking said locking means to remove said support mechanism out of an installed position and to push said mechanism into an installed portion, and curtain rod means (9, 10) carried by said carrier crossbeam for suspending said curtain from said curtain rod means.

2. The support mechanism of claim 1, wherein each mounting foot has a T-configuration.

3. The support mechanism of claim 1, wherein each beam element comprises stop means for limiting a hinging scissors type movement of said beam elements to a maximal 180° movement relative to each other.

4. The support mechanism of claim 1, wherein said locking means comprise a substantially axially movable locking pin in each of said two beam elements and a locking hole in each beam element, said locking pins extending into said locking holes in the locked, installed state of said carrier crossbeam, said operating means including two handle means, one for each beam element.

5. The support mechanism of claim 1, further comprising an information label covering said handle means.

6. The support mechanism of claim 1, wherein said hinge means comprise two hinge plates axially displaced relative to each other, one hinge plate being connected to one of said beam elements, the other hinge plate being connected to the other beam element.

7. The support mechanism of claim 1, wherein at least one mounting foot comprises means for engaging said supporting wall structure against a displacement of said support structure in a direction perpendicularly to a length direction of said carrier crossbeam.

8. The support mechanism of claim 1, wherein said hinge means comprise two hinge plates (4a, 4b) each connected to its respective beam extension (2a, 3a), and a journal pin (4c) interconnecting said two hinge plates, said journal pin extending horizontally when said crossbeam is installed in a working position.

9. The support mechanism of claim 1, wherein said curtain rod means form an integral part of said beam elements.

10. The support mechanism of claim 1, wherein said locking means comprise at least one substantially axially movable locking pin in one of said two beam elements and at least one locking hole in the other beam element, said locking pin extending into said locking hole in the locked, installed state of said carrier crossbeam, said operating means including handle means secured to said one beam element for operating said locking pin and for pulling said beam elements downwardly.

11. The support mechanism of claim 10, wherein said at least one locking pin with its handle means is installed at an outer free end of one of said beam element extensions, and wherein said at least one locking hole is provided in a curved surface of the other beam element facing a respectively curved surface of said outer free end of said one beam element extension.

12. The support mechanism of claim 1, wherein said mounting foot of at least one of said beam elements comprises a shank, said at least one beam element comprising axial guide means for guiding said shank, and compression spring means for biasing said mounting foot.

13. The support mechanism of claim 12, wherein said compression spring means biases said mounting foot in an axially outward direction away from said beam element.

14. The support mechanism of claim 12, wherein said compression spring means biases said mounting foot against said supporting wall structure.

15. A support mechanism for dividing an aircraft cabin into different sections, comprising a carrier crossbeam including two beam elements, hinge means for interconnecting said beam elements with each other, means for locking said beam elements against journalling movements when said beam elements extend substantially in parallel to each other in an installed state, each beam element having a mounting foot for engagement with a supporting wall structure, each beam element further having an extension opposite said mounting foot, said hinge means being arranged between said extension and said mounting foot, operating means operatively arranged for cooperation with said locking means for unlocking said locking means to remove said support mechanism out of an installed position and to push said mechanism into an installed position, and wherein said locking means comprise at least one substantially axially movable locking pin in one of said two beam elements and at least one locking hole in the other beam element, said locking pin extending into said locking hole in the locked, installed state of said carrier crossbeam, said operating means including handle means secured to said one beam element for operating said locking pin and for pulling said beam elements downwardly.

16. The support mechanism of claim 15, wherein said hinge means comprise two hinge plates (4a, 4b) each connected to its respective beam extension (2a, 3a), and a journal pin (4c) interconnecting said two hinge plates, said journal pin extending horizontally when said crossbeam is installed in a working position.

17. The support mechanism of claim 15, further comprising curtain rod means (9, 10) carried by said carrier crossbeam for suspending a curtain from said curtain rod means.

18. The support mechanism of claim 17, wherein said curtain rod means form an integral part of said beam elements.

* * * * *